US010630577B2

(12) United States Patent
Moore et al.

(10) Patent No.: US 10,630,577 B2
(45) Date of Patent: Apr. 21, 2020

(54) SUBSCRIBERLESS DIFFERENTIATED ROUTING SYSTEM AND METHOD

(71) Applicant: Level 3 Communications, LLC, Broomfield, CO (US)

(72) Inventors: Richard D. Moore, Frederick, CO (US); Joseph M. Roy, Grand Blanc, MI (US)

(73) Assignee: Level 3 Communications, LLC, Broomfield, CO (US)

( * ) Notice: Subject to any disclaimer, the term of this patent is extended or adjusted under 35 U.S.C. 154(b) by 107 days.

(21) Appl. No.: 15/594,218

(22) Filed: May 12, 2017

(65) Prior Publication Data

US 2017/0332154 A1    Nov. 16, 2017

Related U.S. Application Data

(60) Provisional application No. 62/336,261, filed on May 13, 2016, provisional application No. 62/339,281, filed on May 20, 2016.

(51) Int. Cl.
| | |
|---|---|
| *H04L 12/725* | (2013.01) |
| *H04Q 3/00* | (2006.01) |
| *H04M 7/12* | (2006.01) |
| *H04L 29/08* | (2006.01) |

(Continued)

(52) U.S. Cl.
CPC ........ *H04L 45/302* (2013.01); *H04L 65/1006* (2013.01); *H04L 65/80* (2013.01);
(Continued)

(58) Field of Classification Search
CPC ....... H04Q 3/0025; H04Q 2213/13541; H04Q 3/0029; H04Q 3/0026; H04M 7/1285;
(Continued)

(56) References Cited

U.S. PATENT DOCUMENTS

| 5,040,171 A * | 8/1991 | Osaki | H04L 12/5602 |
| | | | 370/232 |
| 8,520,668 B2 * | 8/2013 | Terpstra | H04L 45/04 |
| | | | 370/352 |

(Continued)

OTHER PUBLICATIONS

International Search Report dated Jul. 26, 2017, Int'l Appl. No. PCT/US17/032482, Int'l Filing Date May 12, 2017; 3 pgs.
Written Opinion of the International Searching Authority dated Jul. 26, 2017, Int'l Appl. No. PCT/US17/032482, Int'l Filing Date May 12, 2017; 7 pgs.

*Primary Examiner* — Walter J Divito
*Assistant Examiner* — Anthony Luo

(57) ABSTRACT

A differentiated routing system includes a computer-executable system to receive a request from a first network gateway of a native network for establishing a communication service from a calling party terminal to a called party terminal. Upon receipt of the request, the system determines that policy information is not known for the calling party terminal that has originated the request, and therefore append a tag to the request in which the tag indicates that the requested communication service is to be established using one or more generic policies. The generic policies include one or more default policies to be used for establishing the communication service. The system then transmits the request to a routing device, wherein the routing device determines how the communication service is routed through the native network according to the one or more generic policies.

25 Claims, 5 Drawing Sheets

(51) Int. Cl.
*H04L 29/06* (2006.01)
*H04M 7/00* (2006.01)

(52) U.S. Cl.
CPC .......... *H04L 67/18* (2013.01); *H04M 7/1285* (2013.01); *H04Q 3/0025* (2013.01); *H04Q 3/0029* (2013.01); *H04M 7/0096* (2013.01); *H04M 2203/158* (2013.01); *H04Q 2213/13541* (2013.01)

(58) Field of Classification Search
CPC ......... H04M 2203/158; H04M 7/0096; H04M 2203/168; H04L 65/1006; H04L 45/302; H04L 65/80; H04L 67/18
See application file for complete search history.

(56) References Cited

U.S. PATENT DOCUMENTS

| | | | |
|---|---|---|---|
| 2007/0104119 A1* | 5/2007 | Sarkar | H04L 12/4641 370/254 |
| 2008/0307101 A1* | 12/2008 | Chazin | H04L 63/20 709/229 |
| 2012/0321058 A1* | 12/2012 | Eng | H04L 45/00 379/90.01 |
| 2015/0230149 A1* | 8/2015 | Callahan | H04L 45/04 370/328 |
| 2015/0263899 A1 | 9/2015 | Tubaltsev | |
| 2015/0302316 A1* | 10/2015 | Buryak | H04L 51/12 706/12 |
| 2015/0334026 A1 | 11/2015 | Hadavi et al. | |
| 2017/0331729 A1 | 11/2017 | Moore et al. | |

* cited by examiner

US 10,630,577 B2

SUBSCRIBERLESS DIFFERENTIATED ROUTING SYSTEM AND METHOD

CROSS REFERENCE TO RELATED APPLICATIONS

This application is related to and claims priority under 35 U.S.C. § 119 from U.S. Patent Application No. 62/336,261, filed May 13, 2016 entitled "SUBSCRIBERLESS DIFFERENTIATED ROUTING SYSTEM AND METHOD," and U.S. Patent Application No. 62/339,281, filed May 20, 2016, entitled "USER-BASED DIFFERENTIATED ROUTING SYSTEM AND METHOD," both of which are hereby incorporated by reference in their entirety.

TECHNICAL FIELD

Aspects of the present disclosure relate to communication networks and, in particular, to a differentiated routing system and method.

BACKGROUND

Communication service providers (CSPs) generally refer to certain organizations (e.g., companies, enterprises, etc.) that provide telecommunication services, such as voice and data communications access services. Whereas telecommunication services have been traditionally provided by relatively few companies, multiple communication service providers now typically operate to provide these services in any given region. In many cases, the growth in the number of communication service providers has created a favorable environment in which multiple communication service providers may compete for market share with ever-increasing goods and services to be provided for their customers.

SUMMARY

According to one aspect, a differentiated routing system includes a computer-executable system to receive a request from a first network gateway of a native network for establishing a communication service from a calling party terminal to a called party terminal. Upon receipt of the request, the system determines that policy information is not known for the calling party terminal that has originated the request, and therefore append a tag to the request in which the tag indicates that the requested communication service is to be established using one or more generic policies. The generic policies include one or more default policies to be used for establishing the communication service. The system then transmits the request to a routing device, wherein the routing device determines how the communication service is routed through the native network according to the one or more generic policies.

DETAILED DESCRIPTION

Embodiments of the present disclosure provide a differentiated routing system that provides communication services for calling party terminals in a native network. In particular, embodiments of the present disclosure provide a technique for establishing communication services in a native network using a system and method that differentiates communication services delivered to calling party terminals when policy information associated with those calling party terminals may not be known. The differentiation is provided by generating a generic tag that can be used by a routing device, such as a core routing engine (CRE), to differentiate communication services using one or more generic (e.g., default) policies.

Conventionally, to provide differentiated services, communication service providers have operated multiple network domains in which communication services between these domains were provided by gateways that provided various communication services. But these gateways are not easily scalable when used in large networks operating with multiple domains. Embodiments of the present disclosure provide a solution to these problems by differentiating communication services provided through the native network when requests for those communication services are originated from a non-native network. To provide this differentiation of services a tag is generated that is to be used by the CRE to route the communication services differentially according to performance parameters or policies associated with information known about the terminals. Additionally, when a request is issued from a terminal from an non-native network for which policy information may not be readily available, the system includes information in the tag that is used by the CRE to establish the communication services using one or more generic (e.g., default) policies. Thus, certain embodiments may optimally establish communication services at a service level that at least approximates that provided by the non-native network such that the service level is maintained while optimally conserving the resources of the native network even when the policies of terminals of non-native networks are not known.

Figure 1A:
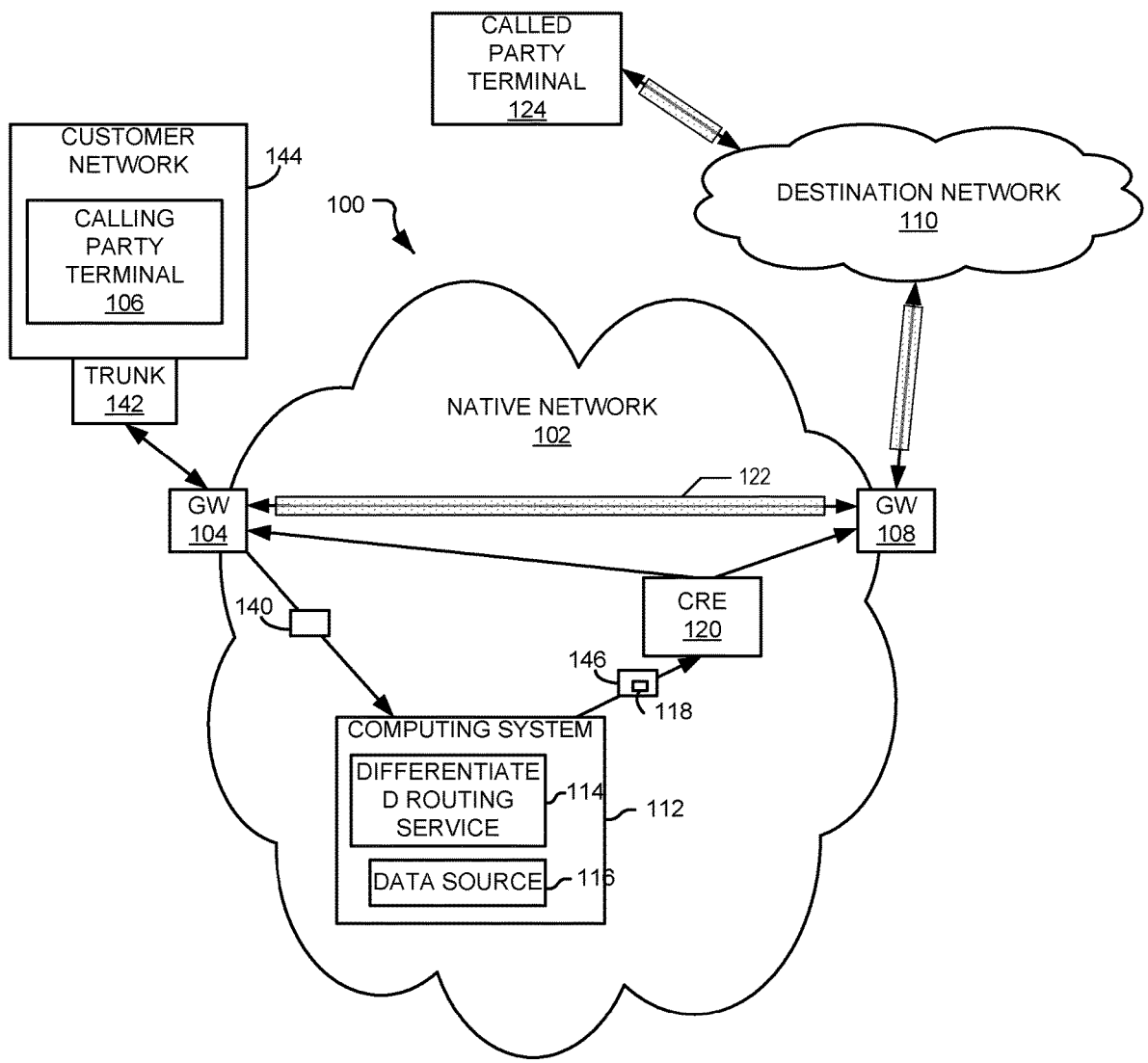
FIG. 1A is a block diagram of an example network employing a differentiated routing system according to one aspect of the present disclosure.

FIG. 1A illustrates an example differentiated routing system 100 according to embodiments of the present disclosure. The system 100 is incorporated in a native network 102 that includes a destination network gateway 104 and a calling party terminal gateway 108. The system 100 includes a computing system 112 or other computing device or system configured with a differentiated routing service 114 and a data source 116. The system 100 provides a communication service 122 between a calling party terminal 106 associated with a customer network 144 and a called party terminal associated with a destination network 110. In particular, the system 100 differentiates the communication service 122 even when policy information for the calling party terminal 106 is not known.

The native network 102 generally refers to a domain in which the system 100 is configured, while the customer network 144 generally refers to a domain external to the domain in which the system 100 is configured. The gateway 104 may be dedicated to communicating with a trunk 142 over which services, such as a call originating from the calling party terminal 106, between the customer network 144 and the native network flow. For example, the customer network 144 may be managed by a corporate enterprise having multiple employees who each have a calling party terminal 106. In many cases, a wholesale agreement may be established between a communication service provider (CSP) that manages the native network 102 and the enterprise who manages the customer network 144. In such a case, a service level agreement (SLA) may be in place with the customer where the SLA defines performance and policies under which communications are provided to the customer. In general, a CSP generally refers to a certain organization that provides telecommunication services, such as voice and data communications access services to customers. Within the customer network there may be many individual subscribers, which may be identified by a phone number for a VoIP device, but the system may not have information or otherwise have a record for every user device of the customer network.

The customer network 144 refers to a domain where policy information and performance requirements may be known for the enterprise or customer associated with the domain but a complete list of discrete subscriber level information may not be known. For example, the customer network 144 may include one that is administered by a CSP that is different than the CSP that administers the native network 102. In such a case, the system 100 may not possess specific information for providing differentiated routing for communication services originating from the customer network 144 but the network may nonetheless need to connect calls through the network or provide other communication services. In another example, the system 100 may possess specific information for providing a service in accordance with some performance parameters or policies at the customer level but may not have some information at the subscriber level.

In general, the computing system 112 executes the differentiated routing service 114 to differentiate services provided through the native network 102 by appending a tag 118 to each request 146 so that a routing device, such as the CRE 120, can differentiate the services 122 based upon routing and/or policies applicable to the service being requested. Nevertheless, some requests for those services may originate from a customer network 144 on a trunk for the customer but in which the identity of the -calling party terminal 106 may not be known. In such cases, an SLA may not be in place, or more likely, an SLA may be in place and it may provide for instances where a performance attribute or policy can be applied at the subscriber level but the system 100 may not have information about each subscriber and thus cannot apply performance or policy information at the granularity of the subscriber. When the system does not have specific performance or policy information applicable to the calling party terminal 106, it provides a mechanism by which the CRE will use some form of default performance and/or policy to route the service through the network. In one example, the system generates a tag 118 with data fields to be used by the CRE. The data fields indicate that the requested communication service is to be applied with some form of generic performance and policy rules. The CRE 120 then provisions the communication service 122 through the native network using one or more routing techniques, which are referred to herein as generic or default because there are not unique policy or performance requirements applicable to the service due to an SLA or other obligation, as will be described in detail herein below. It should be recognized that a "generic" routing policy may nonetheless reflect unique routing attributes of the tag that are generated based on information about the broader customer and any requirements for that customer, and in such cases the routing policy is only generic with respect to situations where unique information based on the calling party terminal is not known. In some cases, such unknown calling party subscribers are referred to as an "Alien TN."

The CRE 120 may establish the communication service by applying default policies and/or routing techniques. For example, the CRE may establish a communication service using a certain specified level of service and/or service type for some, most, or all communication services established through the native network 102. As another example, the CRE 120 may establish a communication service using default routing techniques, such as by establishing the communication service according to the calling party terminal's phone number, called party terminal's 106) phone number, information about the trunk 142 from where the request originated, or according to information known about the called party terminal 106.

The native network 102, customer network 144, and destination network 110 may include a sub-network structure, such as a private network, within an overall communication infrastructure, such as a public communication infrastructure (e.g., the Internet). The native network 102, customer network 144, and destination network 110 may be owned and managed by different communication service providers, or they may be owned and managed by the same communication service provider. In many cases, each communication service provider may operate multiple domains to provide communication services to their subscribers. Although management of communication services may appear to be easier using a single domain, this configuration is often not feasible when operating a large network. For example, operation of communication networks that cross international boundaries may be difficult to implement given the different regulations that are required to be applied in each jurisdiction. Moreover, communication domains operating in one particular region may be constrained to providing different levels of service from what is normally provided when handling communication services from other regional boundaries in which non-native domains impose regulations and/or restrictions not required in their native domain. Accordingly, segregating communication services using domains that correspond with national boundaries may provide an efficient manner of managing communication networks. Additionally, subscribers often have communication needs that differ from one another. Whereas some subscribers expect communication services at cost effective prices, other subscribers demand a relatively high level of service, which are often more expensive to provide.

Conventionally, to resolve these issues, communication service providers have typically operated multiple network domains in which communication services between these domains were provided by bridge ports that generally functioned as gateways that provided communication services between network domains. Although bridge ports may provide one technique for selecting routes for the communication services, they are generally not easily scalable when used in large networks operating with multiple domains and with subscribers whose expected levels of service continually change on an ongoing basis. Within the context of the present disclosure, the term "scalable" means an attribute of a network that represents an ability of the network to grow in size while continuing to provide its intended functionality. For example, aspects of the present disclosure provide the ability to use bridge ports for segregating routes while growing the size of the domain. For example, to provide routing of different types and levels of communication services, a separate bridge port for each type and level of communication service would be required, which would be cumbersome when used with multiple numbers of large network domains.

Embodiments of the present disclosure provide a solution to these problems by differentiating the communication service 122 provided through the native network 102 based upon information, which may be in the form of a tag 118, appended to a request, indicating performance, policy and other types and levels of communication services to be applied to the communication service 122. In particular, embodiments of the present disclosure may differentiate services provided to calling party terminals 124 by generating a tag 118 that is be used by the CRE 120 to establish the communication service 122 using one or more generic (e.g., default) policies. As such, the CRE 120 may provide differentiated services when information about the calling party terminal 106) is known, as well as when another calling party terminal 106) is not known.

In general, generic policies are default policies to be applied for establishing the communication service 122 when policy information about the calling party terminal 124 is not known. Such may be the case when the CSP that administers a customer network 144 is different from the CSP that administers the native network 102. In such a case, the differentiated routing service 114, upon receiving a request for which it does not have unique information (e.g., such as the absence of any SLA parameters or policies stored in a database to which it has access) or where unique information is available in the form of performance and policy but the system does not recognize the calling party terminal and hence cannot apply them but can apply customer level information, generates a tag 118. The information contained with the tag is provided to the routing device such that the routing device (e.g., the CRE 120) uses the tag information to provide the service 122 according to some generic performance and policy. Examples of generic policies may include whether to use an in-country or out-of-country communication service, a particular type of codec to use, and a particular service type to use.

In one embodiment, the native network 102 comprises a data-based communication network, such as an internet protocol (IP) domain that provides communication services via a data network, which may include portions of the Internet. For example, voice communication services may be provided through such networks via a voice over IP (VoIP) protocol. In the specific case of VoIP, the tag 118 may be included in a session initiation protocol (SIP) domain portion of a SIP message, where the information in the tag is used to supplement thee information already forming part of the SIP message and used by the CRE to provide the service.

In some embodiments, the CRE 120 may use certain information known about the non-calling party terminal 124, or the called party terminal 106 to differentiate the communication service 122. For example, the CRE 120 may determine a particular level of service to be used based upon a phone number of the calling party terminal 106 when a request 146 is received including a tag 118 indicating that the communication service 122 is to be established using generic policies. Furthering this example, when the CRE 120 determines that the phone number of the called party terminal 124 is from Germany, the CRE 120 may assign a codec that uses μLaw encoding/decoding, and when the CRE 120 determines that the phone number of the calling party terminal 106 (e.g., calling party terminal) is from the United States, the CRE 120 may assign a codec that uses aLaw encoding/decoding for the communication service 122. As another example, the CRE 120 may determine a particular level of service based upon service level agreement (SLA) information known about the customer network 144. The CRE 120 includes instructions stored in a memory (e.g., a computer-readable medium) and executed on a processor for performing the features of the present disclosure described herein.

A communication service provider, such as an administrator of the native network 102 typically provides communication services to its subscriber terminals according to previously established SLAs. Generally, the SLA indicates the type and/or level of services that the communication service provider is to provide to the subscriber. The type and level of services may include, for example, whether voice, data, short messaging services (SMS), multimedia messaging services (MMS), or any combination thereof are to be provided, the maximum allowable usage in the form of voice call minutes, time of day usage, and/or data bandwidth allocation, a quality of server (QoS) level, a class of service (CoS) level, and the like. When a request is received including a generic tag, the CRE 120 may use SLA information known about the customer network 144 and establish the communication service 122 using one or more elements of the SLA associated with the customer network 144.

The core routing engine 120 administers access of subscriber terminals to its associated domain by negotiating access of a subscriber terminal, such as a customer premise equipment (CPE), wireless handset, or other device, with the native network 102. The core routing engine 120 may store information associated with particular elements of the SLA established for certain called party terminals. For example, the core routing engine 120 may store information associated with particular products (e.g., SMS, MMS, voice, video, etc.), a QoS/CoS level to be maintained for each product, and a country of origin for those calling party terminals. However, when a request 146 is received that is appended with a generic tag 118, the CRE 120 may use default SLA information for differentiating those services.

The native network gateway 104 may be any node at which the calling party terminal 106 accesses the native network 102. For example, the communication service provider that administers the native network 102, which provides a certain specified level of communication services to each subscriber, may allow access to the domain through a dedicated access link (DAL) via the native network gateway 104. The calling party terminal 104, calling party terminal gateway 104, and core routing engine 120 each has one or more processors and executable instructions stored in volatile and/or non-volatile memory for performing the actions and/or steps described herein. Moreover, a network may have many such devices, as well as countless other devices including switches, routers, and servers.

Figure 1B:
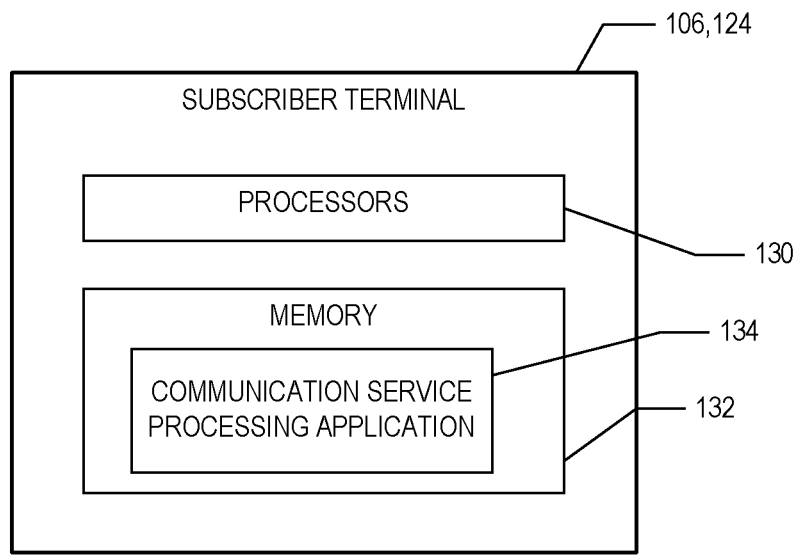
FIG. 1B depicts an example subscriber terminal that may be a component of the differentiated routing system according to one aspect of the present disclosure.

FIG. 1B illustrates an example calling party terminal 106 or called party terminal 124 according to one embodiment of the present disclosure. The calling party terminal 106 or called party terminal 124 is a computing or processing device that includes one or more processors 130 and memory 132 and is to receive data and/or communications from, and/or transmit data and/or communications to, the computing system 112 via the native network 102. For example, the calling party terminal 106 or called party terminal 124 can be a wireless telephone, a landline telephone, or any suitable computing device, such as a personal computer, such as a laptop or notebook computer, a workstation, or other processing device such as a smart phone or a tablet computer. The memory stores a communication service processing application 134 for handling one or more communication services with the core routing engine 120, such as requesting a communication service (e.g., call setup), voice and/or data transmission between the calling party terminal 106 or called party terminal 124 and the core routing engine 120.

Figure 1C:
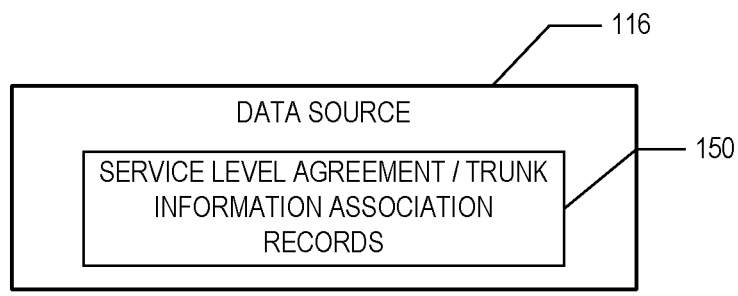
FIG. 1C depicts an example data source that may be accessed by or be a component of the differentiated routing system according to one aspect of the present disclosure.

As best shown in FIG. 1C, the data source 110 stores SLA/trunk information association records 150. The SLA/trunk information association records 150 may be used by the routing service 114 to generate the tag 118 according to SLA information associated with the customer network 144. Information associated with how the service 114 uses the SLA/trunk information association records 150 will be described in detail herein below. Although the data source 110 is shown as being located on, at, or within the computing system 106, it is contemplated that the data source 110 can be located remotely from the computing system 106, such as on, at, or within the memory of the CRE 120.

Figure 2:
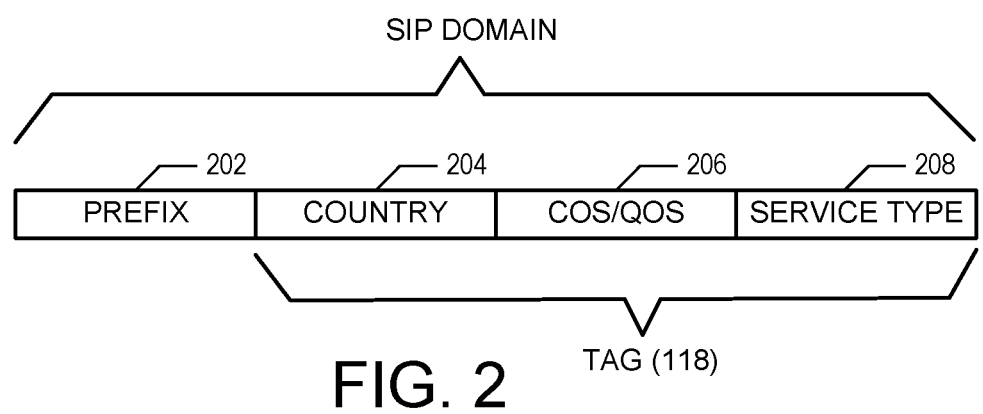
FIG. 2 illustrates an example tag that may be appended to a session initiation protocol (SIP) domain according to one aspect of the present disclosure.

FIG. 2 illustrates an example tag 118 that may be generated by the differentiated routing service 114 according to one embodiment of the present disclosure. As shown, the tag includes information appended to a prefix portion 202 of a SIP domain 200. Nevertheless, it should be appreciated that the tag 118 may be any suitable type that conveys service level agreement information, generic or default performance an policy information, and/or other information for establishing the communication session 122.

The tag includes three portions, a country (e.g., national entity) designation portion 204, a CoS/QoS (e.g., performance parameters to be applied to the communication service) portion 206, and a service type portion 208. The country designation portion 204 includes information associated with a native country to be associated with the calling party terminal 106. The CoS/QoS portion 206 includes information associated with a particular class of service and/or quality of service to be used for the communication session 122. The service type portion 208 includes information associated with one or more service types to be provided for the calling party terminal 106. For example, in the case of communications in which an SLA may be in place, if a communication service 122 is to be established within the country of Great Britain (GBR) using a premium level of service (PREM) using a particular service type of 'SERVICE TYPE 1', a tag 118 such as 'GBR.PREM.LEVEL3_SERVICELEVELTYPE1.NET' could be generated and applied to a SIP domain to convey the tag information to the CRE 120 for routing the communication service 122 and setting appropriate policies for the communication service 122.

In general, the country designation portion 204, the CoS/QoS portion 206, and the service type portion 208 may be useful for differentiating communication services when information about a calling party, such as the calling party terminal 106 is known. However, cases exist where information about the calling party may not be known, such as when requests for those services originate from a customer network 110 in which the identity about the calling party terminal 1064 may not be known. As such, when a request for the communication service 122 is received from a calling party terminal 106, the routing service 114 may generate a generic tag 118 indicating to the CRE 120 that it is to establish the communication service 122 according to generic guidelines.

The routing service 114 may generate the generic tag 118 using any suitable coded structure that enables the CRE 120 to identify the request for the communication service 122 as using default policies. In one embodiment, the routing service 114 may generate the tag 118 by populating each of the country designation portion 204, the CoS/QoS portion 206, and the service type portion 208 with alpha-numeric text information indicating that the requesting communication service 122 is to be established by the CRE 120 as using generic policies. For example, if a communication service 122 is to be established for a request initiated by the calling party terminal 106, a tag 118 such as 'XXX.PREM.LEVEL3_SERVICELEVELTYPE1.NET' could be generated in which the 'XXX' portions of the tag 118 indicates to the CRE 120 that it should select generic routing and policy decisions for the geographic region (e.g., country) aspects of the communication service 122. That is, since the country is not known, the service 114 can insert a generic tag indicating to the CRE 120 so that it can apply generic (e.g., default) geographical routing and policy decisions for the communication service 122. So the tag would be 'XXX.PREM.LEVEL3_SERVICELEVELTYPE1.NET'. Country specific determination is then left up to the CRE, along with any other information which may be determined about the subscriber.

Similarly, the service 114 may apply default tag information for the country designation portion, CoS/QoS portion and/or service type portion, and the CRE may then route the service using the information in those fields.

Although a country designation portion 204, a CoS/QoS portion 206, and a service type portion 208 is described herein, it should be understood that other embodiments of the tag may include additional, fewer, or different portions that are described herein without departing from the spirit and scope of the present disclosure. For example, the differentiated routing service 114 may not include a CoS/QoS portion 206 or the service type portion 208 for various reasons, such as lack of CoS/QoS or service type information known about the destination network domain 110. That is, the differentiated routing service 114 may only include CoS/QoS information or service type information when the differentiated routing service 114 has specific information associated with the determined destination network domain 110 to which the communication service 122 is directed.

Figure 3:
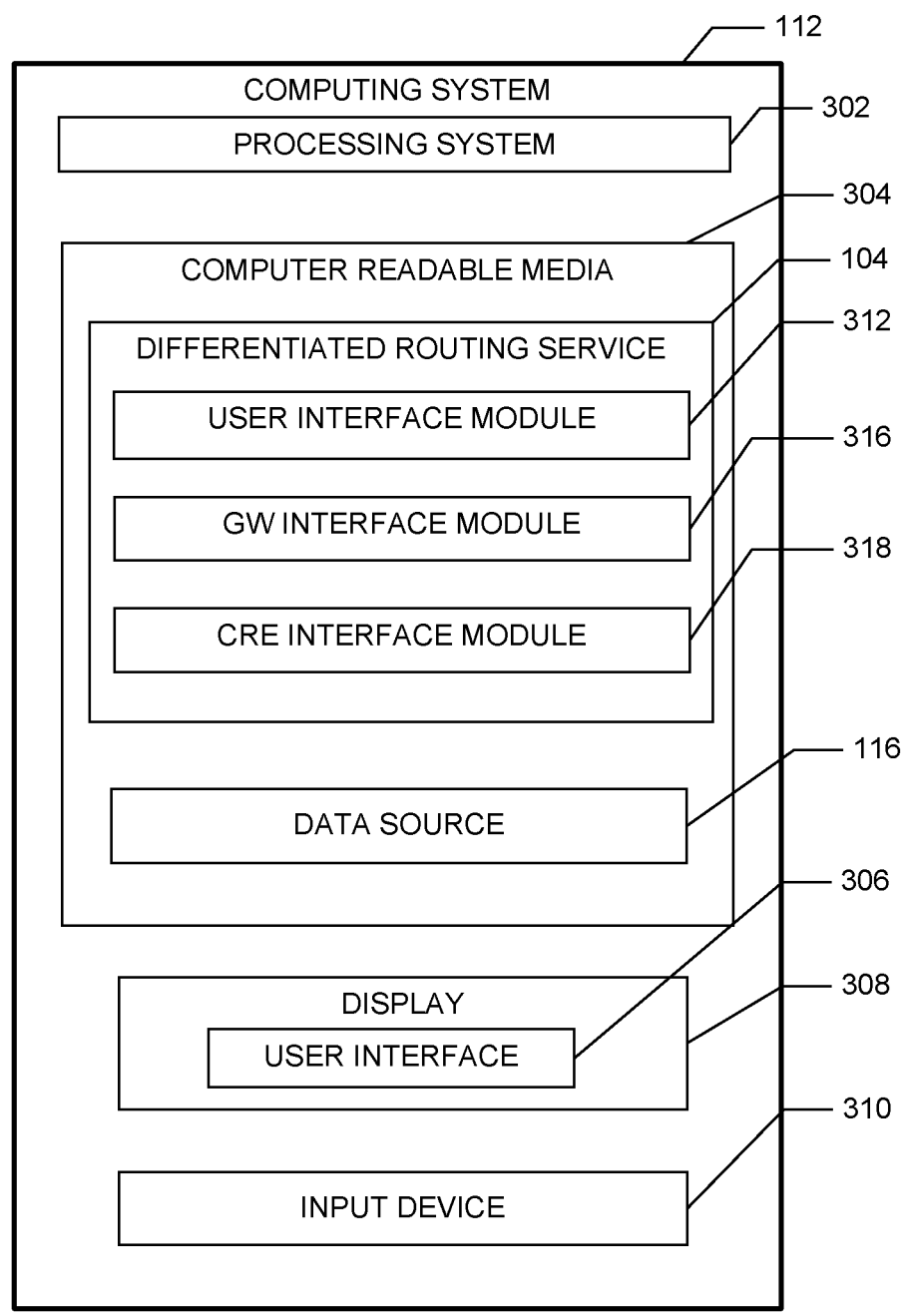
FIG. 3 is a block diagram depicting an example differentiated routing service executed on the computing device according to one embodiment of the present disclosure.

FIG. 3 is a block diagram depicting an example differentiated routing service 114 executed on the computing system 112 according to one embodiment of the present disclosure. The computing system 112 includes a processing system 302 that includes one or more processors or other processing devices. A processor is hardware. Examples of such a computing device include one or more servers, personal computers, mobile computers and/or other mobile devices, and other computing devices. The computing system 102 may communicate with the calling party terminal gateway 104, the called party terminal gateway 108, and/or the CRE 120 via wireless, wired, and/or optical communications.

According to one aspect, the computing system 102 includes a tangible and non-transitory computer readable media 304 on which the service 104, in the form of computer executable instructions, and data source 116 are stored. The differentiated routing service 114 includes instructions or modules that are executable by the processing system 302 to perform the features of the differentiated routing system 100 described herein. The computer readable media 304 may include volatile media, nonvolatile media, removable media, non-removable media, and/or another available media that can be accessed by the computing system 112.

According to one aspect, the computing system 102 may include a user interface 306 displayed on a display 308, such as a computer monitor, for displaying data. The computing system 112 may also include an input device 310, such as a keyboard or a pointing device (e.g., a mouse, trackball, pen, or touch screen) to enter data into or interact with the user interface 306.

A user interface module 312 facilitates the receipt of input data and/or output data from or to a user (e.g., an administrator of the computing system 112), respectively, for manipulating the operation of the system 100. In one example, the user interface module 312 may receive user input for manipulating or otherwise modifying how communication services are to be provided for each terminal 104 and 108 or for certain types of terminals that use the system 100. For example, the user interface module 312 may interact with the user to receive information for diagnosing problems that may occasionally arise with the operation of the system 100. As another example, the user interface module 312 may interact with a user, such as an administrator, for obtaining SLA/tag information association records 150.

A gateway interface module 316 communicates with the calling party terminal gateway 104 to obtain information for establishing a communication service for a calling party terminal 106, and/or providing information to the calling party terminal gateway 104. For example, the gateway interface module 316 may manage receipt of a request message 140 from the calling party terminal gateway 104. The gateway interface module 316 may also append a tag 118 to the response message indicating that the requested communication service 122 is to be established according to generic policies. In one embodiment, the communication service may be provided as a session that is managed according to a SIP protocol in which the tag is appended to a SIP domain.

A CRE interface module 318 communicates with a CRE 120 in the native network 102 to manage sending of message 146 that is appended with a generic tag 118 to the CRE 120. In one embodiment, the tag 118 may be generic such that no differentiating information is included in the tag 118 and all services for which the system has no unique information are thus provided with the same tag. In another embodiment, the tag 118 may include at least some differentiating information for the CRE to connect the communication service 122. For example, the routing service 114 may not have specific SLA association records 150 but may have some geographic information associated with the called or calling party (to derive geographic information and/or a service level for the requested communication service 122, and include the information in the appropriate field of the tag generated and appended to the SIP domain 200.

It should be appreciated that the modules described herein are provided only as an example of a computing device that may execute the differentiated routing differentiated routing service 114 according to the teachings of the present disclosure, and that other computing devices may have the same modules, different modules, additional modules, or fewer modules than those described herein. For example, one or more modules as described in FIG. 3 may be combined into a single module. As another example, certain modules described herein may be encoded and executed on other computing devices, such as the PE device configured in the VLAN 108.

Figure 4:
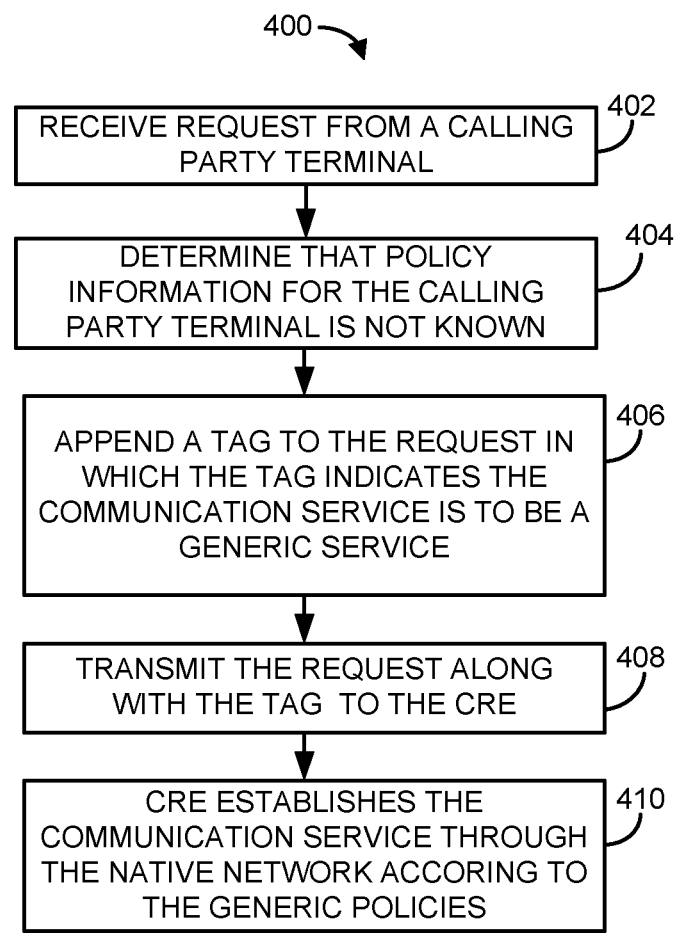
FIG. 4 illustrates an example process that may be performed by the differentiated routing service according to one embodiment of the present disclosure.

FIG. 4 illustrates an example process 400 that may be performed by the differentiated routing system 100 to differentiate a communication service 122 provided to a calling party terminal 106 according to one embodiment of the present disclosure. Initially, at step 402, the differentiated routing service 114 receives a request 140 from a calling party terminal gateway 104 for establishing a communication service for the called party terminal 106. Thereafter at step 404, the differentiated routing service 114 determines that policy information is not known for the calling party terminal 106 that issued the request. For example, the service 114 may identify that the gateway 106 issuing the request is coupled to the customer network 144 for which unique policy information for individual calling party terminals 106 of the customer network 144 may not be known.

At step 406, the service 114 appends a tag to the request in which the tag indicates that the requested communication service is to be established with generic policies. The service 114 may use any suitable technique for indicating that the communication service is to be generic. In one embodiment, the service 114 may populate any one of the country designation portion 204, the CoS/QoS portion 206, and the service type portion 208 with alpha-numeric text information indicating that the requesting communication service 122 is to be established by the CRE 120 with generic policies.

In one embodiment, the service 114 may access the SLA/trunk association records 150 stored in the data source 116 to obtain policy information about the customer network 144, and generate the tag 118 using the obtained policy information. For example, the service 114 may identify a particular QoS level associated with the customer network 144, to which the called party terminal 106 belongs and populate the CoS/QoS portion 206 of the tag 118 with that information so that the CRE 120 can differentiate the communication service 122 based upon the identified QoS level. Here, it should be recognized that the tag may be generated based on the requirements for the broader customer but, in the case of an Alien TN, the tag cannot be further refined to reflect the particular subscriber.

At step 408, the service 114 transmits the request that has been appended with the tag 118 to the CRE 120. Thereafter at step 410, the CRE 120 establishes the communication service through the native network according to the generic policies. In one embodiment, the CRE 120 may set a service level for the communication service 122 using information provided by the routing service 114 that has been stored in the tag 118, or it may set the service level by examining one or more components of the system 100. Although the CRE 120 does may not possess information necessary for specifying certain policies for the communication service 122, it may still set a certain policies for the communication service 122 by examining a called party phone number information or calling party phone number information. Example policies that may be determined by the CRE 120 include an in-country communication service, an out-of-country communication service, which type of codec to use, and a service type to use.

The process described above continues throughout operation of the differentiated routing system 100 for establishing other additional communication services for the same calling party terminal 106 or for other called party terminals 106 in the native network 102. Nevertheless, when use of the system 100 is no longer needed or desired the process ends.

It should be appreciated that the process described herein is provided only as an example and that the differentiated routing service 114 may execute additional steps, fewer steps, or differing steps than those described herein. For example, the steps 402 through 410 may be executed in any suitable order; that is, the steps as described in FIG. 4 are not limited to execution in any particular sequence. As another example, either of the steps 402 through 410 described herein may be executed by another computing device, such as by the CRE 120 or other node in communication with the native network 102 without departing from the spirit or scope of the present disclosure.

Figure 5:
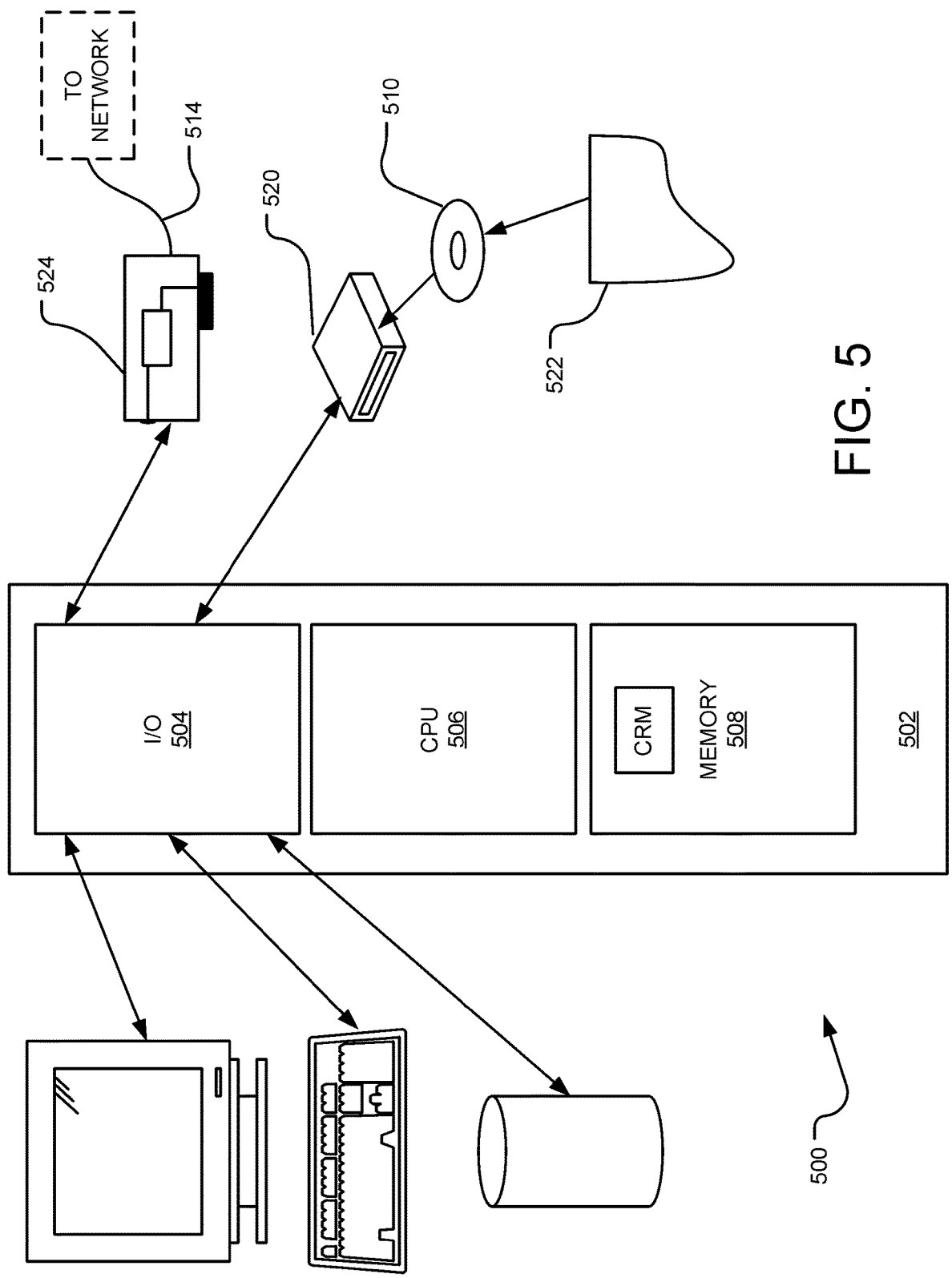
FIG. 5 illustrates an example of a computing system that may implement various systems and methods discussed herein.

FIG. 5 illustrates an example computing system 500 that may implement various systems discussed herein. A general purpose computer system 500 is capable of executing a computer program product to execute a computer process. Data and program files may be input to the computer system 500, which reads the files and executes the programs therein such as the differentiated routing service 114. Some of the elements of a general purpose computer system 500 are shown in FIG. 5 wherein a processing system 502 is shown having an input/output (I/O) section 504, a hardware central processing unit (CPU) 506, and a memory section 508. The processing system 502 of the computer system 500 may have a single hardware central-processing unit 506 or a plurality of hardware processing units. The computer system 500 may be a conventional computer, a server, a distributed computer, or any other type of computing device, such as one or more external computers made available via a cloud computing architecture. The presently described technology is optionally implemented in software devices loaded in memory 508, stored on a configured DVD/CD-ROM 510 or storage unit 512, and/or communicated via a wired or wireless network link 514, thereby transforming the computer system 500 in FIG. 5 to a special purpose machine for implementing the described operations.

The memory section 508 may be volatile media, nonvolatile media, removable media, non-removable media, and/or other hardware media or hardware mediums that can be accessed by a general purpose or special purpose computing device. For example, the memory section 508 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable instructions, data structures, program modules, algorithms, and/or other data. The communication media may also include a non-transitory information delivery technology. The communication media may include wired and/or wireless connections and technologies and be used to transmit and/or receive wired and/or wireless communications.

The I/O section 504 is connected to one or more optional user-interface devices (e.g., a user interface such as a keyboard 516 or the user interface 512), an optional disc storage unit 512, an optional display 518, and an optional disc drive unit 520. Generally, the disc drive unit 520 is a DVD/CD-ROM drive unit capable of reading the DVD/CD-ROM medium 510, which typically contains programs and data 522. Computer program products containing mechanisms to effectuate the systems and methods in accordance with the presently described technology may reside in the memory section 508, on a disc storage unit 512, on the DVD/CD-ROM medium 510 of the computer system 500, or on external storage devices made available via a cloud computing architecture with such computer program products, including one or more database management products, web server products, differentiated routing service products, and/or other additional software components. Alternatively, a disc drive unit 520 may be replaced or supplemented by a tape drive unit, or other storage medium drive unit. An optional network adapter 524 is capable of connecting the computer system 500 to a network via the network link 514, through which the computer system can receive instructions and data. Examples of such systems include personal computers, Intel or PowerPC-based computing systems, AMD-based computing systems, ARM-based computing systems, and other systems running a Windows-based, a UNIX-based, a mobile operating system, or other operating system. It should be understood that computing systems may also embody devices such as mobile phones, tablets or slates, multimedia consoles, gaming consoles, set top boxes, etc.

When used in a LAN-networking environment, the computer system 500 is connected (by wired connection and/or wirelessly) to a local network through the network interface or adapter 524, which is one type of communications device. When used in a WAN-networking environment, the computer system 500 typically includes a modem, a network adapter, or any other type of communications device for establishing communications over the wide area network. In a networked environment, program modules depicted relative to the computer system 500 or portions thereof, may be stored in a remote memory storage device. It is appreciated that the network connections shown are examples of communications devices for and other means of establishing a communications link between the computers may be used.

Some or all of the operations described herein may be performed by the processing system 502, which is hardware. Further, local computing systems, remote data sources and/or services, and other associated logic represent firmware, hardware, and/or software configured to control operations the system 100 and/or other components. The system set forth in FIG. 5 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., hard disk drive), optical storage medium (e.g., CD-ROM); magnetooptical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A differentiated routing system comprising:
a computing system in communication with a first network gateway of a native network, the first network gateway communicatively coupled to a calling party terminal, the computing system in further communication with a second network gateway of a non-native network, the second network gateway communicatively coupled to a called party terminal through a destination network of the non-native network, the computing system comprising a processor and a memory to store instructions that are executed by the processor to:
    receive a request from the first network gateway for establishing a communication service from the calling party terminal to the called party terminal;
    determine that the request from the first network gateway of the native network does not comprise unique policy information associated with the second network gateway of the non-native network;
    append a tag to the request, the tag indicating that the requested communication service is to be established using one or more generic policies for establishing the communication service in response to determining that the request does not comprise the unique policy information; and
    transmit the request appended with the tag to a routing device, wherein the routing device uses the tag to determine how the communication service is routed through the native network according to the one or more generic policies.

2. The differentiated routing system of claim 1, wherein the instructions are further executed to:
    receive another request from the first network gateway for establishing another communication service for another calling party terminal, wherein policy information associated with the other calling party terminal is known;
    obtain the policy information associated with the other calling party terminal, the policy information associated with the other calling party terminal used for applying at least one policy decision to the other communication service;
    append the policy information associated with the other calling party terminal to the other request; and
    transmit the other request appended with the policy information associated with the other calling party terminal to the routing device, the policy information associated with the other calling party terminal used for instructing the routing device to route the other communication service according to the policy information associated with the other calling party terminal.

3. The differentiated routing system of claim 1, wherein the one or more generic policies comprise at least one of an in-country communication service, an out-of-country communication service, which type of codec to use, and a service type to use.

4. The differentiated routing system of claim 1, wherein the routing device determines how the communication service is routed through the native network by analyzing at least one of a calling party phone number of the calling party terminal that accesses the native network through the first network gateway, or a called party phone number of the called party terminal.

5. The differentiated routing system of claim 1, wherein the native network is administered by a communication service provider (CSP) that is different than the CSP that administers a customer network.

6. The differentiated routing system of claim 1, wherein the instructions are further executed to append the tag to a session initiation protocol (SIP) domain portion of a SIP message.

7. The differentiated routing system of claim 6, wherein the instructions are further executed to generate the tag by populating the SIP domain portion of the SIP message with alpha-numeric text information indicating that the requested communication service is to be established using the one or more generic policies, the tag having a first portion defining a national entity, a second portion defining one or more performance parameters to be applied to the communication service, and a third portion defining a service type.

8. The differentiated routing system of claim 1, wherein the instructions are further executed to:
    identify a trunk used by the calling party terminal to access the first network gateway;
    obtain performance and policy information based on a service level agreement (SLA) associated with a customer having the trunk; and
    include the obtained performance and policy information in the tag.

9. A differentiated routing method comprising:
    receiving, using instructions stored on a computer-readable medium and executed by a processor, a request from a first network gateway of a native network for establishing a communication service from a calling party terminal in the native network to a called party terminal in a non-native network;
    determining, using the instructions executed by the processor, that the request from the first network gateway of the native network does not comprise unique policy information associated with the called party terminal in the non-native network;

appending, using the instructions executed by the processor, a tag to the request, the tag indicating that the requested communication service is to be established using one or more generic policies to be used for establishing the communication service in response to determining that the request does not comprise the unique policy information; and transmitting, using the instructions executed by the processor, the request appended with the tag to a routing device, wherein the routing device uses the tag to determine how the communication service is routed through the native network according to the one or more generic policies.

10. The differentiated routing method of claim 9, further comprising:

receiving another request from the first network gateway for establishing another communication service for another calling party terminal, wherein policy information associated with the other calling party terminal is known;

obtaining the policy information associated with the other calling party terminal, the policy information associated with the other calling party terminal used for applying at least one policy decision to the other communication service;

appending the policy information associated with the other calling party terminal to the other request; and transmitting the other request appended with the policy information associated with the other calling party terminal to the routing device, the policy information associated with the other calling party terminal used for instructing the routing device to route the other communication service according to the policy information associated with the other calling party terminal.

11. The differentiated routing method of claim 9, wherein the one or more generic policies comprise at least one of an in-country communication service, an out-of-country communication service, which type of codec to use, and a service type to use.

12. The differentiated routing method of claim 9, further comprising, determining, by the routing device, how the communication service is routed through the native network by analyzing at least one of a calling party phone number of the calling party terminal that accesses the native network through the first network gateway, or a called party phone number of the called party terminal.

13. The differentiated routing method of claim 9, wherein the native network is administered by a communication service provider (CSP) that is different than the CSP that administers a customer network.

14. The differentiated routing method of claim 9, further comprising appending the tag to a session initiation protocol (SIP) domain portion of a SIP message.

15. The differentiated routing method of claim 14, further comprising generating the tag by populating the SIP domain portion of the SIP message with alpha-numeric text information indicating that the requested communication service is to be established using the one or more generic policies, the tag having a first portion defining a national entity, a second portion defining one or more performance parameters to be applied to the communication service, and a third portion defining a service type.

16. The differentiated routing method of claim 9, further comprising:

identifying a trunk used by the calling party terminal to access the first network gateway;

obtaining performance and policy information based on a service level agreement (SLA) associated with a customer having the trunk; and including the obtained performance and policy information in the tag.

17. A non-transitory computer readable medium storing instructions that when executed by a processor cause the processor to perform:

receiving a request from a first network gateway of a non-native network, wherein the request is for establishing a communication service from a calling party terminal in the native network to a called party terminal in a non-native network;

determining that the request from the first network gateway of the non-native network does not comprise unique policy information associated with the called party terminal in the non-native network;

appending a tag to the request, the tag indicating that the requested communication service is to be established using one or more generic policies, the one or more generic policies comprising one or more default policies to be used for establishing the communication service in response to determining that the request does not comprise the unique policy information; and transmitting the request appended with the tag to a routing device, wherein the routing device uses the tag to determine how the communication service is routed through a native network according to the one or more generic policies.

18. The non-transitory computer readable medium of claim 17, further comprising instructions when executed by the processor cause the processor to perform:

receiving another request from the first network gateway for establishing another communication service for another calling party terminal, wherein policy information associated with the other calling party terminal is known;

obtaining the policy information associated with the other calling party terminal, the policy information associated with the other calling party terminal used for applying at least one policy decision to the other communication service;

appending the policy information associated with the other calling party terminal to the other request; and transmitting the other request appended with the policy information associated with the other calling party terminal to the routing device, the policy information associated with the other calling party terminal used for instructing the routing device to route the other communication service according to the policy information associated with the other calling party terminal.

19. The non-transitory computer readable medium of claim 17, wherein the one or more generic policies comprise at least one of an in-country communication service, an out-of-country communication service, which type of codec to use, and a service type to use.

20. The non-transitory computer readable medium of claim 17, further comprising instructions when executed by the processor further cause the processor to perform determining, by the routing device, how the communication service is routed through the native network by analyzing at least one of a calling party phone number of the calling party terminal that accesses the native network through the first network gateway, or a called party phone number of the called party terminal.

21. A differentiated routing system comprising:
a computing system comprising at least one processor and at least one memory to store instructions that are executed by the at least one processor to:
  receive a request from a gateway router of a native network, wherein the request is for establishing a communication service for a calling party terminal, the request including identifying information associated with the calling party terminal;
  determine a destination network domain of the communication service according to the identifying information included in the request, wherein the destination network domain is of a non-native network; and
  include a tag in the request, the tag indicating that the requested communication service is to be established using one or more generic policies for establishing the communication service in response to determining that the request from the gateway router of the native network does not comprise unique policy information associated with the destination network of the non-native network, the tag instructing the gateway router to establish the communication service at the determined destination network domain.

22. The differentiated routing system of claim 21, wherein the destination network domain comprises a geographical region where the called party terminal resides.

23. The differentiated routing system of claim 21, wherein the destination network domain comprises one associated with an enterprise.

24. The differentiated routing system of claim 21, wherein the identifying information including at least one of a portion of a calling party phone number, at least a portion of a called party phone number, and a trunk that transmitted the request.

25. The differentiated routing system of claim 21, wherein the instructions are further executed to append the tag to a sip message, the sip message instructing the gateway router to establish the communication service at the destination network domain.

* * * * *